(12) United States Patent
Pinto et al.

(10) Patent No.: US 10,826,950 B2
(45) Date of Patent: *Nov. 3, 2020

(54) SELECTIVE SERVICE CONTROL TO MOBILE IP NETWORK

(71) Applicant: KAJEET, INC., McLean, VA (US)

(72) Inventors: David Pinto, Rockville, MD (US);
John Shorey, Penhook, VA (US);
Daniel John Neal, Chevy Chase, MD (US)

(73) Assignee: KAJEET, INC., McLean, VA (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/054,964

(22) Filed: Aug. 3, 2018

(65) Prior Publication Data
US 2018/0343288 A1    Nov. 29, 2018

Related U.S. Application Data

(63) Continuation-in-part of application No. 14/102,452, filed on Dec. 10, 2013, now Pat. No. 10,057,300.
(Continued)

(51) Int. Cl.
*H04L 29/08* (2006.01)
*G06F 17/30* (2006.01)
(Continued)

(52) U.S. Cl.
CPC .......... *H04L 65/1096* (2013.01); *H04L 12/14* (2013.01); *H04L 12/1403* (2013.01); *H04L 12/1435* (2013.01); *H04L 61/1541* (2013.01); *H04L 65/103* (2013.01); *H04L 65/80* (2013.01); *H04L 67/16* (2013.01); *H04M 15/8044* (2013.01); *H04M 15/8061* (2013.01); *H04M 15/82* (2013.01); *H04M 15/8214* (2013.01); *H04W 4/24* (2013.01);
(Continued)

(58) Field of Classification Search
CPC . H04L 65/1096; H04L 12/1403; H04L 12/14; H04L 12/1435; H04L 61/1541; H04L 67/16; H04L 65/80; H04L 65/103; H04L 61/2007; H04L 61/2076; H04L 61/1511; H04L 67/02; H04W 4/24; H04M 15/8061; H04M 15/82; H04M 15/8214; H04M 15/8044; H04M 15/81
USPC ....................................................... 709/225
See application file for complete search history.

(56) References Cited

U.S. PATENT DOCUMENTS

2007/0192858 A1    8/2007   Lum
2007/0294419 A1    12/2007  Ulevitch
(Continued)

*Primary Examiner* — Moustafa M Meky
*Assistant Examiner* — Elizabeth Kassa
(74) *Attorney, Agent, or Firm* — BakerHostetler

(57) ABSTRACT

Systems and methods are described for managing services of a computing device over a mobile network where requests for managed or unmanaged services are translated to corresponding IP addresses sent to the computing device and corresponding requests sent to the translated IP addresses are either permitted, rated, quality controlled or secured if the computing device has a valid data plan or is otherwise permissioned for using the mobile network, are denied if filtered and if the computing device does not have a valid data plan or is not otherwise permissioned and the request corresponds to the first address, and are permitted, rated, quality controlled or not secured even if the computing device does not have a valid data plan or is not otherwise permissioned if the request corresponds to the second address.

22 Claims, 8 Drawing Sheets

Related U.S. Application Data

(60) Provisional application No. 61/735,946, filed on Dec. 11, 2012.

(51) Int. Cl.
*G06F 11/34* (2006.01)
*G06F 11/30* (2006.01)
*H04L 29/06* (2006.01)
*H04L 12/14* (2006.01)
*H04L 29/12* (2006.01)
*H04W 4/24* (2018.01)
*H04M 15/00* (2006.01)

(52) U.S. Cl.
CPC ....... *H04L 61/1511* (2013.01); *H04L 61/2007* (2013.01); *H04L 61/2076* (2013.01); *H04L 67/02* (2013.01); *H04M 15/81* (2013.01)

(56) References Cited

U.S. PATENT DOCUMENTS

| | | |
|---|---|---|
| 2008/0147787 A1 | 6/2008 | Wilkinson et al. |
| 2009/0144752 A1 | 6/2009 | Shneerson |
| 2009/0238135 A1 | 9/2009 | De et al. |
| 2009/0262741 A1 | 10/2009 | Jungck et al. |
| 2011/0225419 A1 | 9/2011 | Munger et al. |
| 2012/0324568 A1 | 12/2012 | Wyatt et al. |
| 2013/0227283 A1 | 8/2013 | Williamson et al. |
| 2013/0227284 A1 | 8/2013 | Pfeffer et al. |
| 2013/0298201 A1 | 11/2013 | Aravindakshan et al. |
| 2014/0089488 A1 | 3/2014 | Chong et al. |

# SELECTIVE SERVICE CONTROL TO MOBILE IP NETWORK

CROSS REFERENCE TO RELATED APPLICATIONS

This application is a continuation-in-part of U.S. patent application Ser. No. 14/102,452, filed Dec. 10, 2013, which claims benefit under 35 U.S.C. § 119(e) of Provisional U.S. Patent Application No. 61/735,946, filed Dec. 11, 2012, the contents of which are incorporated herein by reference in their entirety.

TECHNICAL FIELD

The present disclosure relates to system for managing network services accessible to a computing device.

BACKGROUND

Personal computers and other types of computing devices typically come equipped with a pre-installed operating system and various application programs for performing typical functions, such as word processing programs for word processing and browser programs for accessing the Internet, email, etc. Some such devices come installed only with enough software to allow the device to boot up, thereafter requiring the user to select and install an operating system and any desired application programs. Other devices include an operating system, but do not include applications to be installed on the device, because the operating system is designed to access such applications over a network. Such devices are designed to be used while connected to the Internet or other networks and support applications that reside on the World Wide Web (the "Web"), for example, instead of being installed on the device.

One such device is the GOOGLE CHROMEBOOK, which is shipped with CHROME OS, which uses the LINUX kernel, and the GOOGLE CHROME Web browser with an integrated media player. The CHROMEBOOK has limited offline capability and is primarily designed to be used while connected to the Internet. Users may add desired applications for the CHROMEBOOK from the CHROME Web store.

To make use of such applications, however, it is necessary for the devices to have access to an Internet connection and to stay connected during use, which requires the user to either be connected to a wired or wireless Internet access point and typically to have contracted with a network access provider to obtain access and sufficient bandwidth to make use of the applications. When traditional access and feature control methods are not available, or the user has not paid for access/features or has exceeded access/feature limitations, the device will not be able to access or fully utilize the Web-based or other network-based applications, limiting the effectiveness and usefulness of the device.

SUMMARY

Systems and methods are described for managing services of a computing device over a mobile network where requests for managed or unmanaged services are translated to corresponding IP addresses sent to the computing device and corresponding requests sent to the translated IP addresses are either permitted, rated, quality controlled or secured if the computing device has a valid data plan for using the mobile network or is otherwise permissioned to use the network are denied if filtered and if the computing device does not have a valid data plan or is not otherwise permissioned and the request corresponds to the first address, and are permitted, rated, quality controlled or not secured even if the computing device does not have a valid data plan or is not otherwise permissioned if the request corresponds to the second address.

DETAILED DESCRIPTION OF ILLUSTRATIVE EMBODIMENTS

For computing devices that only access applications over the Internet, a user is only able to access those applications, and any documents or files created based on those applications, when the device is connected to the Internet via a data network connection, such as a Radio Access Network (RAN), Wi-Fi network, etc. connection, and when the user has a then valid data plan or otherwise permissioned (e.g., ad-sponsored) access to such network by the owner and/or manager of such network. If the user has no data plan, or network connection, or the user has a data plan and access to a network connection, but has exceeded a time or pricing limit for the data plan, the user will not be able to access the applications or any documents or files created from those applications, including the user's email, calendar, contacts, etc.

In an embodiment, the computing device may be provided with an embedded connection to the Web or cloud via the RAN that is essentially invisible to the user. This embodiment allows users that do not have a data plan or that have used up their data plan quota (time/price/bandwidth, etc.) or are otherwise are not permissioned to use such network to still have access to certain application services, such as email, disk drive storage, etc., while blocking other application services, such as search, news, etc.

Figure 1:
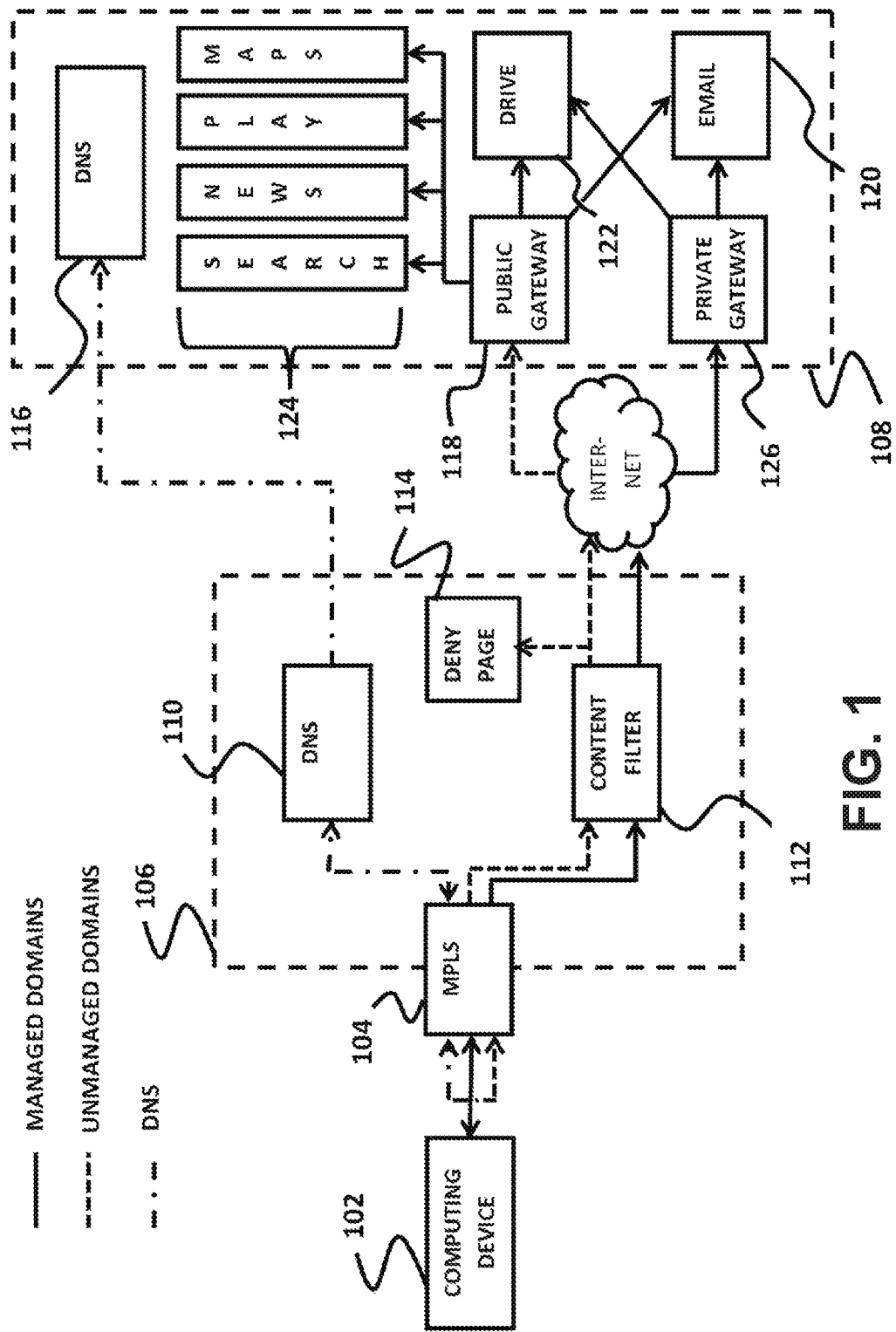
FIG. 1 is a diagram of an embodiment of a selective access control network for a computing device.

As illustrated in FIG. 1, a computing device 102 is connected to a multiprotocol label switching (MPLS) platform 104 for a network service provider. The computer device issues various requests to access different URLs or IP addresses that form inputs to the MPLS platform 104. The MPLS platform 104 may direct the requests and data from the computing device 102 to other devices in or accessible from an access control provider's system 106 based on short path labels rather than long network addresses, thereby avoiding complex lookups in routing tables. The labels may identify virtual links or paths between nodes rather than endpoints and may encapsulate packets of various network protocols. Hence, requests to access different URLs or IP addresses are received by MPLS 104 and labeled with short path labels as DNS requests, managed domains requests or unmanaged domains requests. The MPLS 104 may direct the requests using the short path labels as appropriate to different locations within the access control provider's system 106.

When the applications or services accessible on the application provider's network 108 through the computing device 102 are associated with unique IP addresses, or even ranges of IP addresses, controlling access to the applications may be straightforward. A requested URL/URI or IP address for an accessible service may be allowed through to the DNS server 110, and a request to an access controlled service may be redirected by a content filter 112 to a customized deny page 114.

However, some application providers do not associate a unique IP address or range of IP addresses with particular applications or services. The same IP address may provide access to multiple services. In addition, many of the services may be provided over secure socket layer (SSL), which causes the requested URI to be encrypted, thereby making it impossible to associate a request that arrives over the SSL with a specific service of the application provider and therefore making it impossible to allow or block the request.

In an embodiment, a solution may be provided to the problems associated with application providers that provide services with SSL and/or do not associate different services with unique IP addresses. As illustrated in FIG. 1, the computing device 102 may be provided with an embedded connection to the MPLS 104. All DNS requests received from the computing device 102 may be directed to the DNS server 110, which translates the DNS request to manage domains that belong to new IP addresses provided by the application provider. The application provider provides a new IP address (meaning an IP address that does not currently exist on the application provider's DNS server 116) for every service, including those that should remain available to the computing device, even if the computing device is not currently supported by a data plan or is otherwise permissioned to use such network. For example, if a user of the computing device 102 made a request for email.com or drive.application.com, which are managed domains for allowed services, the DNS server 110 may translate each request to the IP address provided by the application provider for allowed services (i.e., email.com would be translated to x.x.x.x and drive.application.com would be translated to y.y.y.y).

On the other hand, the DNS server 110 cannot translate requests for unmanaged domains for disallowed services, so the request may be sent through to the application service provider's DNS server 116, where it is translated to an IP address (i.e., search.application.com would be translated to z.z.z.z). The translated IP addresses for the allowed and disallowed services would then be sent back to the computing device 102 via DNS server 110, which allows the access control provider to manage access to those services. At the same time, the translated IP address for the allowed services may not be published by the application providers DNS server 116 so as to prevent unauthorized access to those services from outside of the access provider's system. It is also best if the translated IP addresses are whitelisted to the access control provider's DNS server 110 and are not loaded to any publicly accessible DNS.

The translated requests may then be directed by the MPLS 104 to the content filter 112, which decides whether to permit the service request or deny the service request. When the user of the computing device 102 still has a valid data plan or is otherwise permissioned to use the network, all requests may be directed as requests for unmanaged domains by the content filter 112, which may send the requests through the Internet to the public gateway 118, where all regularly accessible applications/services may be accessed, such as email 120 and drive storage 122, as well as applications 124 which might be inaccessible under certain circumstances. When the user of the computing device 102 has an invalid data plan or is otherwise not perrmissioned to use the network, requests for permitted services may be routed through the Internet to private gateway 126, where allowed services, such as email 120 and drive storage 122 may be allowed, but access to other applications, such as applications 124 may not be possible. At the same time, when the data plan is not valid, requests to access controlled services may be routed to deny page 114 instead.

Figure 2:
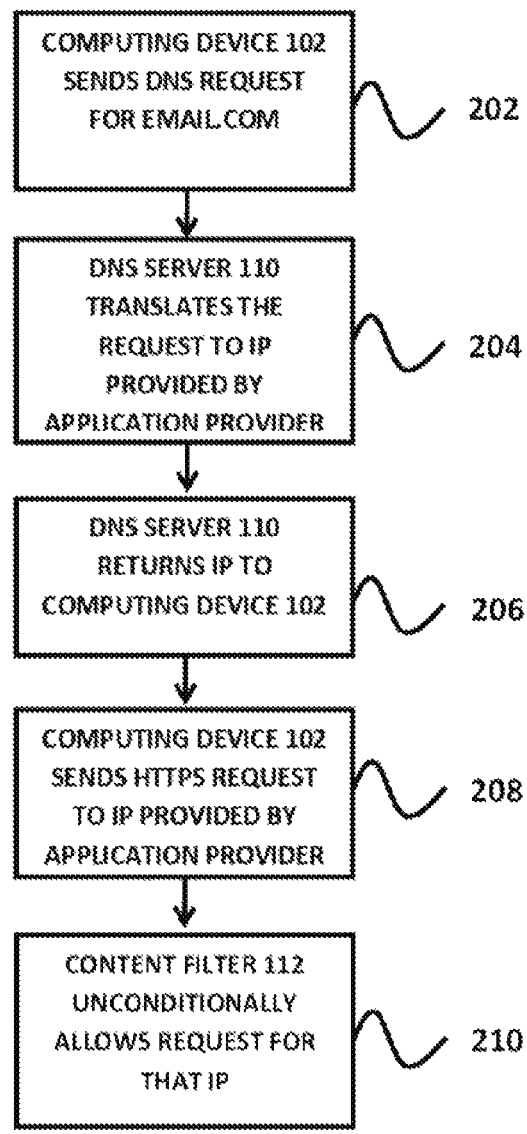
FIG. 2 is a flow chart illustrating an embodiment for handling requests to managed domains.

As a further explanation of the above process, requests to managed domains, e.g., email.com, may be handled as further illustrated in FIG. 2. When the computer device 102 sends a DNS request for a managed domain (permitted service), step 202, the DNS server 110 may translate the managed domain request to the IP address provided by the application provider 204. The DNS server 110 then returns that IP address to the computing device 102, step 206. The computing device 102 then sends an HTTPS request to the IP address provided by the application provider, step 208. The MPLS may then translate that HTTPS request to a short path label and direct that label to the content filter 112, which may be configured to unconditionally allow requests to that path (IP address) and therefore permit the request to go through to the service so requested, step 210.

Figure 3:
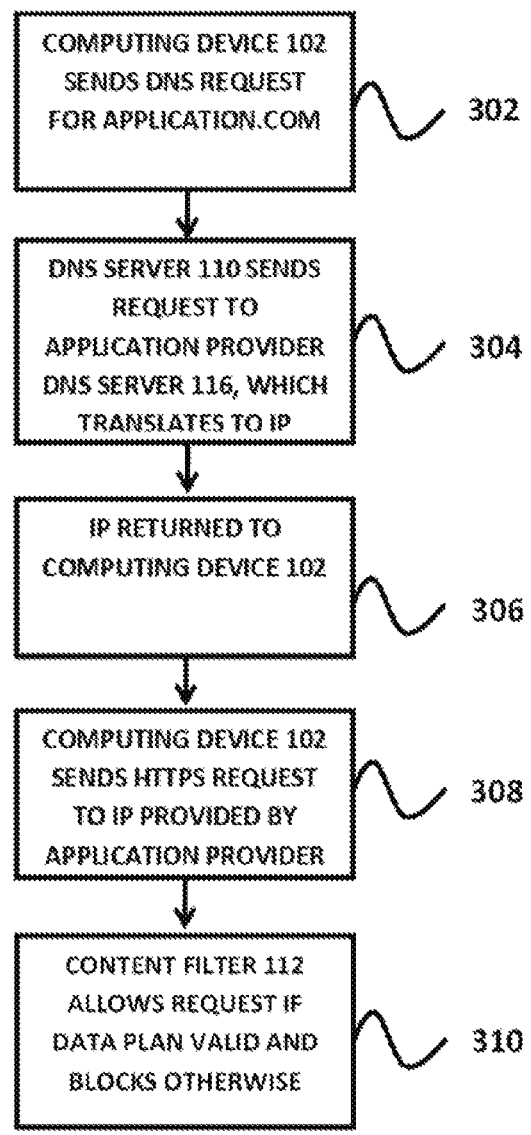
FIG. 3 is a flow chart illustrating an embodiment for handling requests to an unmanaged domain.

In contrast, requests to unmanaged domains, such as application.com may be handled in accordance with FIG. 3. In step 302, the computing device 102 sends a request for application.com, which is an unmanaged domain. The DNS server 110 cannot translate the DNS as it has no IP address that corresponds to it from the application provider, so the request is sent through to the DNS server 116, step 304, which provides the translation and returns this to DNS server 110, which returns the IP address to the computing device 102, step 306. The computing device 102 then sends an HTTPS request to that IP, step 308, the short label for which may be allowed by the content filter 112 if the data plan is valid, by routing the request through the Internet to the public gateway 118, or denying the request, if the data plan is not valid, step 310.

In accordance with the embodiment, if the computing device 102 is within range of the RAN (which is almost ubiquitous) or other wireless network, then the computing device can access applications, services, documents, email, contacts, calendars, and other permitted services, even if the user does not have a data plan, does not have a valid data plan, is without access to Wi-Fi, or is otherwise not permissioned to use a detectable wireless network. Provision of such a feature removes a major difference between more traditional computing devices that store applications and documents on the computing devices themselves and this new form of computing device that stores applications and documents over the cloud. Both devices now have local access to applications and documents and files when otherwise disconnected.

In an embodiment, the providers of the computing devices may contract in advance with access service providers and/or wireless network owners to enable their computing devices, and therefore the users of their computing devices, to have a certain level of controlled access all of the time, even when the user of the computer device does not have a data plan or a valid data plan or is otherwise no permissioned to use their wireless network. For example, GOOGLE could contract with various access service providers to make sure that a GOOGLE CHROMEBOOK always had access to a network when a user of a GOOGLE CHROMEBOOK was attempting to use a GOOGLE application, regardless of any relationships between the user and the access providers. If desired, such access could be kept completely secret and invisible to the user, i.e., the device works when accessing some pre-selected applications (e.g., only Google applications hosted in a location other than on the device) and does not work when accessing other applications, without any indication or explanation as to why. Third parties could also contract to provide access to networked applications accessible from user's devices. For example, in a workplace environment, a mall, a college campus, etc., an entity (such as an employer, a store, or an advertiser) could provide free network access to any users of such devices regardless of whether the user's otherwise had network access rights. Such access may be provided in secret, but could also be advertised in some manner, such as routing requests from the content filter to a advertising page instead of the deny page 114.

A number of computing systems have been described throughout this disclosure. The descriptions of these systems are not intended to limit the teachings or applicability of this disclosure. Further, the processing of the various components of the illustrated systems may be distributed across multiple machines, networks, and other computing resources. For example, components of the rule engine, process engine, database and corresponding applications may be implemented as separate devices or on separate computing systems, or alternatively as one device or one computing system. In addition, two or more components of a system may be combined into fewer components. Further, various components of the illustrated systems may be implemented in one or more virtual machines, rather than in dedicated computer hardware systems. Likewise, the databases and other storage locations shown may represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown may communicate with any other subset of components in various implementations.

Depending on the embodiment, certain acts, events, or functions of any of the algorithms described herein may be performed in a different sequence, may be added, merged, or left out altogether (e.g., not all described acts or events are necessary for the practice of the algorithms). Moreover, in certain embodiments, acts or events may be performed concurrently, e.g., through multi-threaded processing, interrupt processing, or multiple processors or processor cores or on other parallel architectures, rather than sequentially.

Figure 4:
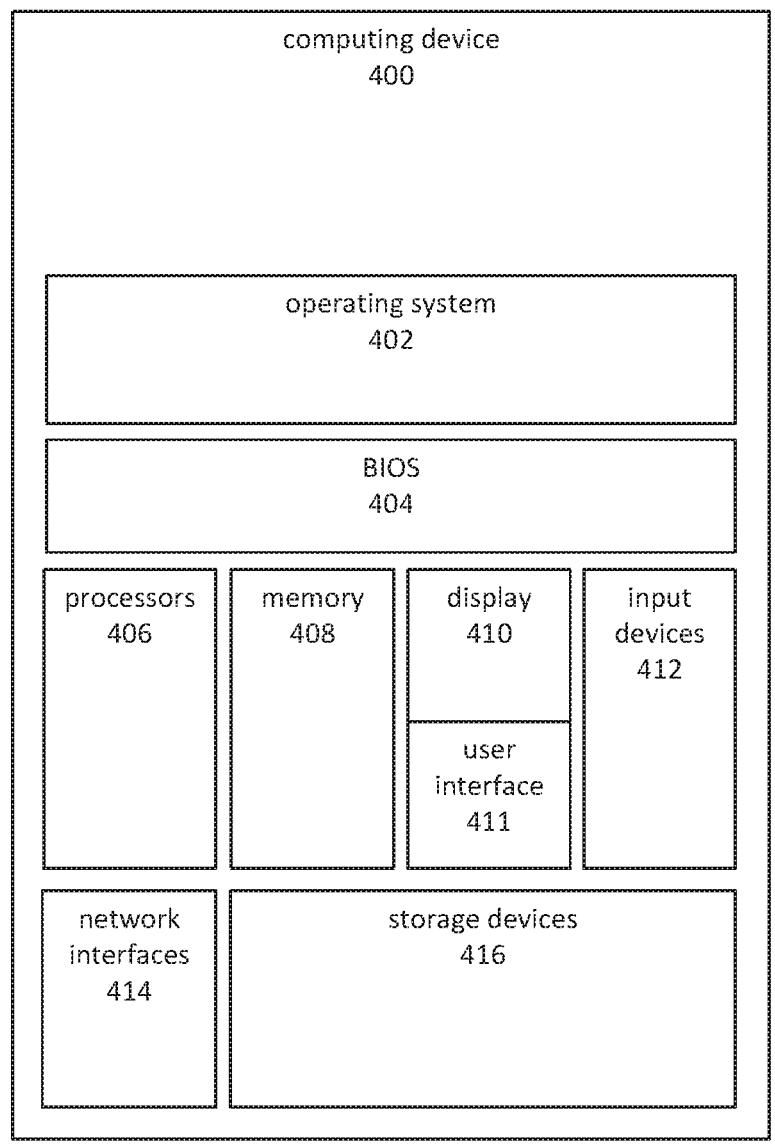
FIG. 4 is a block diagram of a computing system.

FIG. 4 depicts an embodiment of an exemplary implementation of a computing device 400 suitable for practicing aspects of the present disclosure. Computing device 400 may be configured to perform various functions described herein by executing instructions stored on memory 408 and/or storage device 416, or over a network via network interfaces 414. Various examples of computing devices include personal computers, cellular telephones, smartphones, tablets, workstations, servers, and so forth. Embodiments may also be practiced on distributed computing systems comprising multiple computing devices communicatively coupled via a communications network.

One or more processors 406 includes any suitable programmable circuits including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above example embodiments are not intended to limit in any way the definition and/or meaning of the term "processor."

Memory 408 and storage devices 416 include non-transitory computer readable storage mediums such as, without limitation but excluding signals per se, random access memory (RAM), flash memory, a hard disk drive, a solid state drive, a diskette, a flash drive, a compact disc, a digital video disc, and/or any suitable memory. In the exemplary implementation, memory 408 and storage device 416 may include data and/or instructions embodying aspects of the disclosure that are executable by processors 406 (e.g., processor 406 may be programmed by the instructions) to enable processors 406 to perform the functions described herein. Additionally, memory 408 and storage devices 416 may comprise an operation system 402, basic input-output system ("BIOS") 404, and various applications.

Display 410 includes at least one output component for presenting information to a user of the computing device and may incorporate a user interface 411 for providing interactivity through the display 410. Display 410 may be any component capable of conveying information to a user of the computing device. In some implementations, display 410 includes an output adapter such as a video adapter and/or an audio adapter or the like. An output adapter is operatively coupled to processor 406 and is configured to be operatively coupled to an output device such as a display device (e.g., a liquid crystal display (LCD), organic light emitting diode (OLED) display, cathode ray tube (CRT), "electronic ink" display, or the like) or an audio output device (e.g., a speaker, headphones, or the like).

Input Devices 412 includes at least one input component for receiving input from a user. Input component 412 may include, for example, a keyboard, a pointing device, a mouse, a stylus, a touch sensitive panel (e.g., a touch pad or a touch screen incorporated into the display 410), a gyroscope, an accelerometer, a position detector, an audio input device, or the like. A single component such as a touch screen may function as both an input device 412 and a display 410.

Network interfaces 414 may comprise one or more devices configured to transmit and receive control signals and data signals over wired or wireless networks. In various embodiments, one or more of network interfaces 414 may transmit in a radio frequency spectrum and operate using a time-division multiple access ("TDMA") communication protocol, wideband code division multiple access ("W-CDMA"), and so forth. In various embodiments, network interfaces 414 may transmit and receive data and control signals over wired or wireless networks using Ethernet, 802.11, Internet protocol ("IP") transmission, and so forth. Wired or wireless networks may comprise various network components such as gateways, switches, hubs, routers, firewalls, proxies, and so forth.

Embodiments may perform selective feature control, such as rating control, video resolution control, application performance or other application feature control, quality of service control and/or security control instead of, or in addition to, selective access control. With respect to generic feature control, a request may be made for service from an IP address, which service can be controlled in some manner, such as controlling the resolution of video from a video streaming web site, or controlling bandwidth available for use of a video game or other online application. For example, with respect to rating control, variable rating for mobile traffic is based on destination. For instance, all traffic to Facebook may be free or the first 500 MB on YouTube may be free. However, when rating encrypted traffic to an application provider that is using the same IP rate for multiple services, it previously was impossible to rate one service differently than another. The present disclosure provides a solution to this problem.

Figure 5:
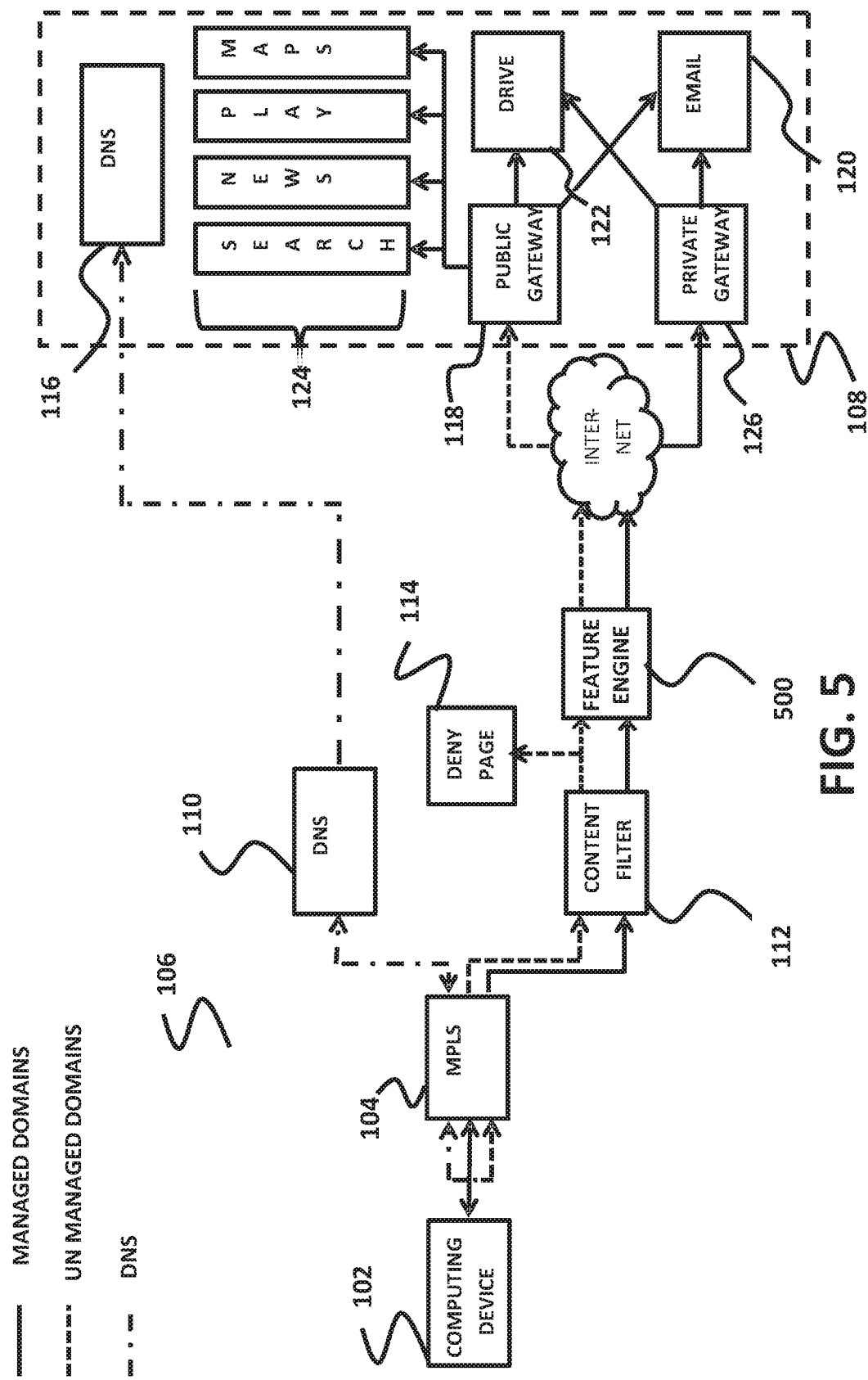
FIG. 5 is a diagram of an embodiment of a selective rating control network for a computing device.

FIG. 5 depicts an embodiment that controls a feature, such as the rating of requests issued by the computing device 102. The MPLS 104 may direct the issued DNS request to the DNS server 110, which translates the DNS request for managed domains to new IP addresses obtained from the application provider. On the other hand, the DNS server 110 cannot translate the DNS requests for unmanaged domains, so the request may be sent through to DNS server 116, where it is translated to an IP address. The translated IP address is then sent back to the computing device 102 via DNS server 110.

The MPLS 104 may then direct the translated requests to the content filter 112, which decides whether to permit or deny the service request based on the user's data plan or other criteria. When the user of the computing device 102 still has a valid data plan or is otherwise permissioned to use the network, all requests may be directed as requests for unmanaged domains by the content filter 112, which may send the requests through the Internet to the public gateway 118. When the user of the device 102 has an invalid data plan or is otherwise not permissioned to use the network, requests for permitted services may be directed through the Internet to private gateway 126, or alternatively may be directed to deny page 114. A feature engine or controller 500, such as the rating engine 700 of FIG. 7 may then apply a special rate based on the user's data plan or some other criteria. The rating engine 700 can explicitly identify even encrypted traffic to a specific service offered by an application provider by the destination IP, which is controlled by the DNS server 110. In an alternate embodiment, the MPLS 104 may direct the translated requests to the feature engine/controller 500 or rating engine 700 without first routing them to the content filter 112.

Hence, in an embodiment, the feature engine or controller may be a rating controller, the first feature control may be a first price and the second feature control may be a second price. In an embodiment, the feature controller may be a video resolution controller, the first feature control may be a first video resolution and the second feature control may be a second video resolution. In an embodiment, the feature controller may be an application performance controller, the first feature control may be a first level of application performance and the second feature control may be a second level of application performance.

Figure 6:
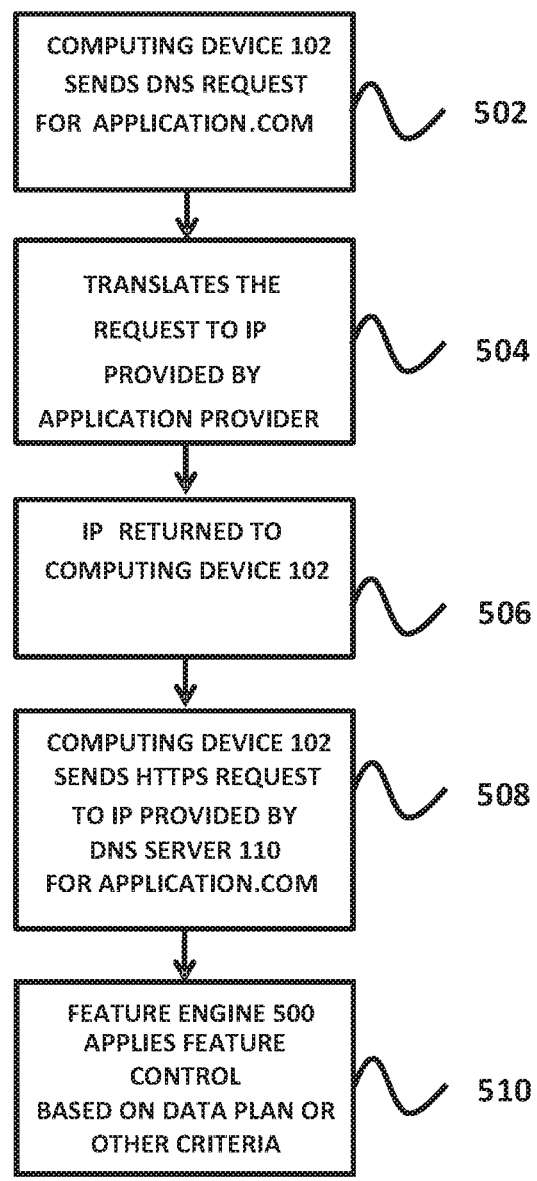
FIG. 6 is a flow chart illustrating an embodiment for handling requests to a managed domain.

As a further explanation of the system disclosed in FIG. 5 and process described above, requests to control unmanaged domains may be handled in accordance with FIG. 6. In step 502, the computing device 102 sends a request for access to a website, such as application.com, which is a managed domain. The DNS server 110 translates the DNS request to an IP address that was obtained from the application provider, step 504. The DNS server 110 returns the IP address to the computing device 102, step 506. The computing device 102 then sends an HTTPS request to that IP address, step 508, and the feature engine 500 applies a feature control, such as special rate, based on the user's data plan or other criteria, step 510, thereby managing the domain.

Figure 7:
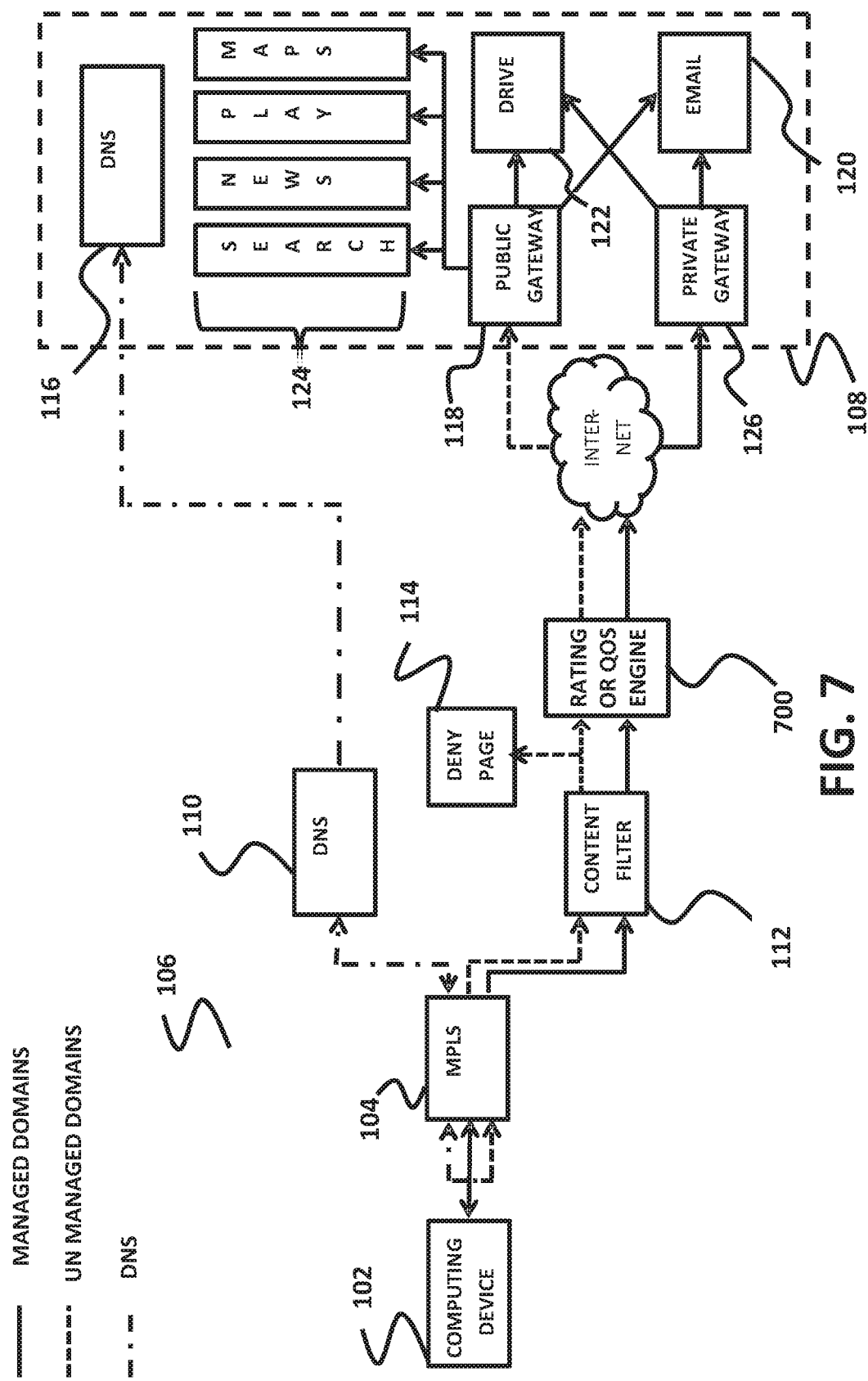
FIG. 7 is a diagram of an embodiment of a selective quality of service control network for a computing device.

FIG. 7 depicts an embodiment in which the feature engine 500 of FIG. 5 may be a rating engine or Quality of Service (QoS) engine 700. When the feature engine is a QoS engine 700, selective quality of service control may be performed in a manner similar to rating control. QoS refers to allowed traffic speed. A DNS request to an internet domain is translated, either by the DNS server 110 for managed domains or the DNS server 116 for unmanaged domains. The translated IP address is then sent back to the computing device 102. The MPLS 104 may then direct the translated requests to the content filter 112, which decides whether to permit or deny the request based on the user's data plan or other criteria. A QoS engine 700, which may either take the place of the rating engine or be essentially placed in parallel with the rating engine, may then provide different traffic speeds limits for different domains. In an alternative embodiment, the MPLS 104 may direct the translated requests to the QoS engine without first routing them to the content filter 112.

Figure 8:
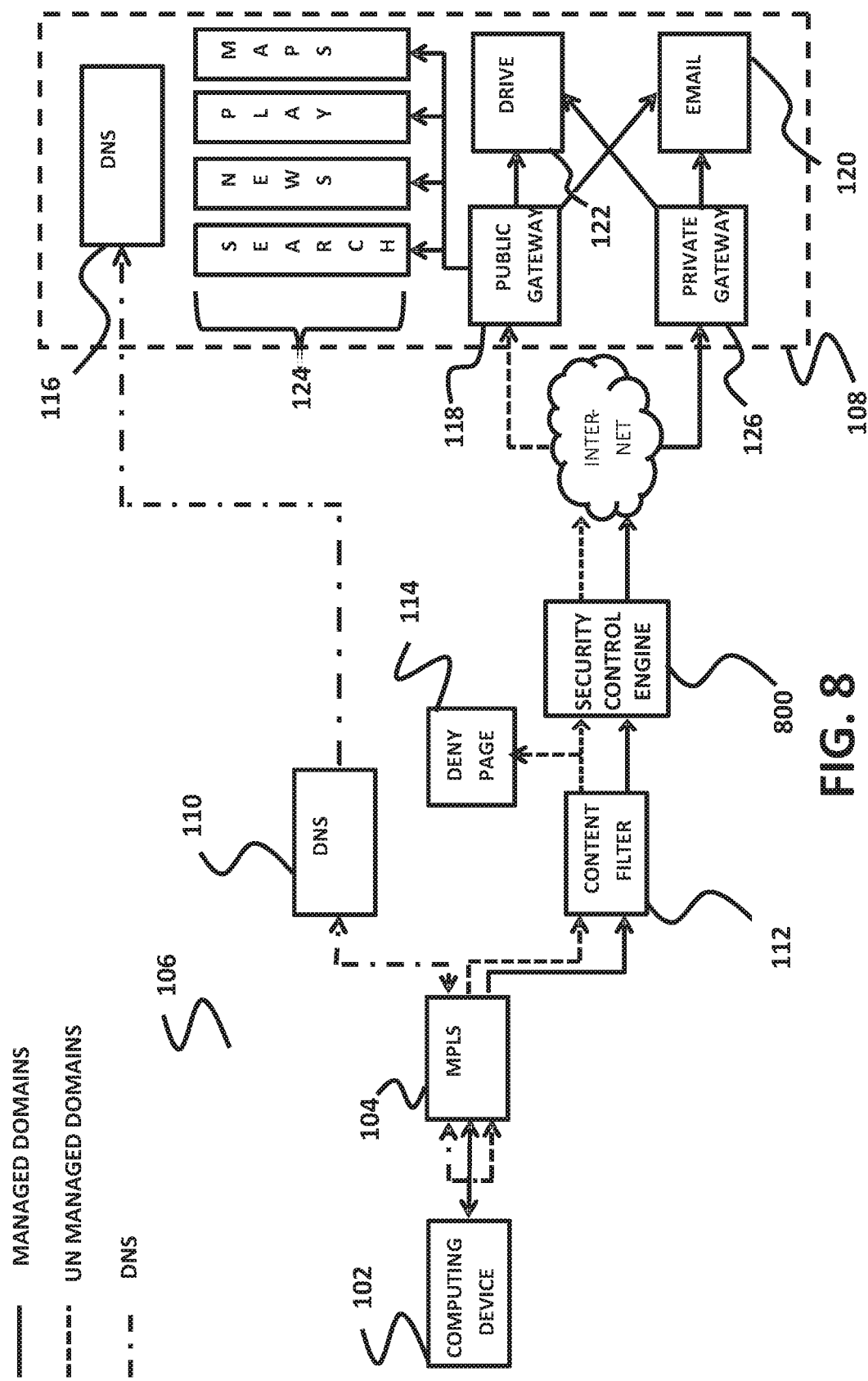
FIG. 8 is a diagram of an embodiment of a selective security control network for a computing device.

FIG. 8 depicts another embodiment in which selective security control may be performed in a manner similar to rating control and quality of service control. Security controls protect the computing device 102 from network threats. A DNS request to an internet domain is translated, either by the DNS server 110 for managed domains or the DNS server 116 for unmanaged domains. The translated IP address is then sent back to the computing device 102. The MPLS 104 may then direct the requests to the content filter 112, which decides whether to permit or deny the service request based on the user's data plan or other criteria. A security control engine 800, such as a firewall, either taking the place of the rating/QoS engine 700 of FIG. 7 or placed in parallel with the rating engine/QoS 700, can protect the computing device 102 from network threats. In an alternate embodiment, the MPLS 104 may direct the translated requests to the security control engine without first routing them to the content filter 112.

The DNS server 110 may also need to be updated so that it stays in sync with the global DNS server 116. The DNS server 110 controls the IP assignment for managed domains. These IP addresses are selected from the existing IP range that belongs to the application provider's network 108. Since the application provider may change the IP ranges in its network 108 from time to time, the DNS server 110 may need to be updated accordingly. To ensure that the DNS server 110 is in sync with the global DNS server 116, the global DNS server 116 may be queried each time that a predetermined number of minutes has passed and the IP ranges associated with the managed domains may be obtained. The IP range associated with the managed domain in the DNS server 110 may be checked. If the IP range associated with the managed domain in the DNS server 110 is not fully contained within the range obtained from the global DNS server 116, the IP range defined in the system's DNS server 110 may be updated.

Conditional language used herein, such as, among others, "may," "might," "e.g.," and the like, unless specifically stated otherwise, or otherwise understood within the context as used, is generally intended to convey that certain embodiments include, while other embodiments do not include certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated may be made without departing from the spirit of the disclosure. As will be recognized, the processes described herein may be embodied within a form that does not provide all of the features and benefits set forth herein, as some features may be used or practiced separately from others. The scope of protection is defined by the appended claims rather than by the foregoing description. All changes which come within the meaning and range of equivalency of the claims are to be embraced within their scope.

What is claimed:

1. A system for managing access of a computing device to one or more services over a network, comprising:
    a first server configured to receive a first request for a service among the one or more services from the computing device, to translate the first request to a first address corresponding to the first request if the first request is for a managed service among the one or more services, and to send the first request to a second server if the first request is for an unmanaged service among the one or more services, the first server being further configured to receive a second address from the second server for the first request for the unmanaged service, the first server being further configured to send the first address or the second address to the computing device; and
    a feature controller configured to receive a second request from the computing device based on either the first address or the second address, to set a first feature control that will apply to the second request if the computing device has a valid data plan for using the network or is otherwise permissioned to use the network and the second request corresponds to the second address, and to set a second feature control that will apply to the second request even if the computing device does not have a valid data plan or is otherwise not permissioned to use the network if the second request corresponds to the first address.

2. The system as recited on claim 1, wherein the feature controller is a rating controller, wherein the first feature control is a first price, and wherein the second feature control is a second price.

3. The system as recited on claim 2, wherein the feature controller further includes a video resolution controller, wherein the first feature control of the video resolution controller is a first video resolution, and wherein the second feature control of the video resolution controller is a second video resolution.

4. The system as recited on claim 3, wherein the feature controller further includes an application performance controller, wherein the first feature control of the application performance controller is a first level of application performance, and wherein the second feature control of the application performance controller is a second level of application performance.

5. The system as recited on claim 2, wherein the feature controller further includes an application performance controller, wherein the first feature control of the application performance controller is a first level of application performance, and wherein the second feature control of the application performance controller is a second level of application performance.

6. The system as recited on claim 1, wherein the feature controller is a video resolution controller, wherein the first feature control is a first video resolution, and wherein the second feature control is a second video resolution.

7. The system as recited on claim 1, wherein the feature controller is an application performance controller, wherein the first feature control is a first level of application performance, and wherein the second feature control is a second level of application performance.

8. The system as recited in claim 1, further comprising a filter configured to receive the second request from the computing device prior to the feature controller based on either the first address or the second address, to permit the second request to proceed to the feature controller if the computing device has a valid data plan for using the network or is otherwise permissioned to use the network and the second request corresponds to the second address, to deny the second request to proceed to the rating controller if the computing device does not have a valid data plan for using the network or is otherwise not permissioned to use the network and the second request corresponds to the second address, and to permit the second request even if the computing device does not have a valid data plan or is otherwise not permissioned to use the network if the second request corresponds to the first address.

9. The system as recited in claim 8, further comprising a labeler configured to receive the second request and label the second request with a label indicating if the second request corresponds to the first address or the second address, the labeler being further configured to direct the second request to the filter based on the label.

10. The system as recited in claim 9, wherein the label includes an encapsulated packet of one or more network protocols.

11. The system as recited in claim 8, wherein the filter is further configured to direct the second request to a deny page on a web server if the second request is denied.

12. The system as recited in claim 1, wherein the second request is for a computer application accessible over the network, and wherein the feature controller is further configured to route the second request to a private gateway through which the computer application can be accessed.

13. The system as recited in claim 1, wherein the second request is for a computer application accessible over the network, and wherein the feature controller is further configured to route the second request to a public gateway through which the computer application can be accessed.

14. A non-transitory computer readable storage medium comprising instructions for managing access of a first computing device to one or more services over a network that, when executed on one or more second computing devices, cause the one or more second computing devices to at least:
    receive a first request for a service among the one or more services from the first computing device;
    translate the first request to a first address corresponding to the first request if the first request is for a managed service among the one or more services;
    send the first request to a server if the first request is for an unmanaged service among the one or more services;
    receive a second address from the server for the first request for the unmanaged service;
    send the first address or the second address to the first computing device;

receive a second request from the first computing device based on either the first address or the second address; and set a first feature control for the second request if the first computing device has a valid data plan for using the network or is otherwise permissioned to use the network and the second request corresponds to the second address or set a second feature control for the second request even if the first computing device does not have a valid data plan or is otherwise not permissioned to use the network if the second request corresponds to the first address.

15. The non-transitory computer readable storage medium as recited on claim 14, wherein the first feature control is a first price and wherein the second feature control is a second price.

16. The non-transitory computer readable storage medium as recited on claim 14, wherein the first feature control is a first video resolution and wherein the second feature control is a second video resolution.

17. The non-transitory computer readable storage medium as recited on claim 14, wherein the first feature control is a first level of application performance and wherein the second feature control is a second level of application performance.

18. The non-transitory computer readable storage medium as recited in claim 14, the instructions further causing the one or more second computing devices, prior to the first feature control or the second feature control being set, to permit the second request if the first computing device has a valid data plan for using the network or is otherwise permissioned to use the network and the second request corresponds to the second address and deny the second request if the first computing device does not have a valid data plan for using the network or is otherwise not permissioned to use the network and the second request corresponds to the second address, or permit the second request even if the first computing device does not have a valid data plan or is otherwise not permissioned to use the network if the second request corresponds to the first address.

19. The non-transitory computer readable storage medium as recited in claim 18, the instructions further causing the one or more second computing devices to:

receive the second request and label the second request with a label indicating if the second request corresponds to the first address or the second address; and direct the second request based on the label.

20. The non-transitory computer readable storage medium as recited in claim 19, wherein the second request is directed to a deny page on a web server if the second request is denied.

21. The non-transitory computer readable storage medium as recited in claim 14, wherein the second request is for a computer application accessible over the network, and wherein the instructions further cause the second request to be routed to a private gateway through which the computer application can be accessed.

22. The non-transitory computer readable storage medium as recited in claim 14, wherein the second request is for a computer application accessible over the network, and wherein the instructions further cause the second request to be routed to a public gateway through which the computer application can be accessed.

* * * * *